Patented Nov. 2, 1948

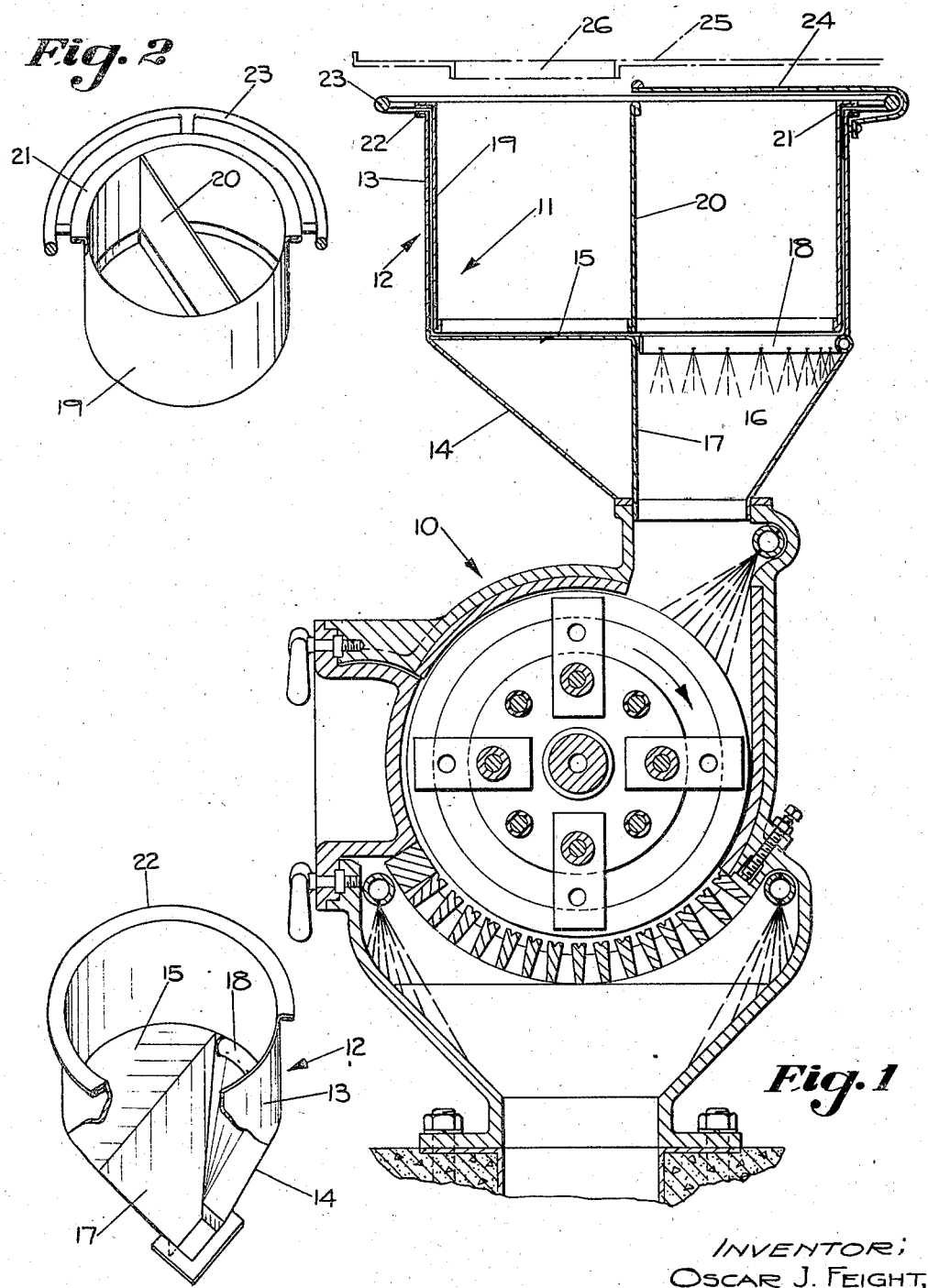

2,453,006

UNITED STATES PATENT OFFICE 2,453,006

BATCH FEED HOPPER FOR GARBAGE GRINDERS

Oscar J. Feight, Columbus, Ohio, assignor, by mesne assignments, to The Jeffrey Manufacturing Company, a corporation of Ohio Application November 19, 1945, Serial No. 629,609

1 Claim. (Cl. 241—101)

This invention relates to a feed hopper, particularly for a garbage grinder or the like.

An object of the invention is to provide an improved and simplified device of this type.

A more specific object of the invention is to provide such a device in which garbage may be dumped into the hopper and there inspected, for example, in order to remove silverware or the like, after which the garbage may be fed into the feed chute leading to a grinder, the construction being such as to prevent injury to the operator or attendant by preventing extension of his hand into any portion of the grinder.

Other objects of the invention will appear hereinafter, the novel features and combinations being set forth in the appended claim.

In the accompanying drawings,

Fig. 1 is a sectional elevational view of a garbage grinder and attached feed hopper incorporating the features of my invention;

Fig. 2 is a perspective view, with parts broken away, showing the inner hopper or drum portion of the feed hopper; and Fig. 3 is a perspective view, with parts in section, of the main hopper part of the feed hopper, with the inner hopper or drum and the cover plate removed.

In Fig. 1 of the drawings there is illustrated a garbage or similar grinder 10 which is provided with my improved feed hopper. The feed hopper in its entirety is designated by the reference character 11 and includes an outer or main hopper 12, the principal parts of which are an upper cylindrical or drum portion 13 and a lower or cone portion 14.

The cylindrical or drum portion 13 is provided over a portion of its bottom area with a bottom plate or member 15 which preferably covers at least half of the bottom area of the upper cylindrical portion 13, which covered area is located to one side of a diametrical line. The other half of the bottom of the upper cylindrical portion 13 is open and constitutes a feed opening from half of the bottom area of the cylindrical portion 13 to a feed chute 16 which is formed in part by approximately half of the lower main portion 14 and by a diametrical upstanding partition 17 which may be formed by bending over a portion of the bottom member 15 and forming it into the cone 14.

The bottom of the feed chute 16 leads to the feed throat of the garbage grinder 10. Adjacent the top of the feed chute 16 and preferably around the curved or semi-cylindrical portion thereof I provide a spray pipe 18 which is connected to a source of water and sprays or flushes the garbage through the feed chute 16 and into the grinder 10.

Within the upper cylindrical portion 13 of the feed hopper 11 there is a cylindrical inner hopper or drum 19 which is mounted for free rotation about an upright axis in said upper cylindrical portion 13. The inner hopper 19 is provided with a diametrically extending upright partition 20 which, of course, operates to divide it into two compartments. The upper edge of the inner hopper 19 is preferably bent over and crimped around its entire periphery, as best illustrated in Fig. 2 of the drawings where part of the resulting rim 21 is shown in section, thus providing a reinforcing rim adjacent said upper edge.

The upper edge of the cylindrical portion 13 is also provided with a reinforcing rim 22. Attached to the rim 22 of the inner hopper 19 is a continuous wheel or ring 23 which is attached thereto by appropriate spokes and which constitutes an operating mechanism by which the inner hopper 19 may be rotated within the upper cylinder 13. A cover plate 24 is attached to the upper portion of the cylinder or drum 13 and extends over approximately half of the upper surface of both the upper cylinder 13 and the inner hopper 19, being preferably semi-disc-shaped or, in other words, being substantially a disc which is cut across a diameter whereby one-half of the open upper end of the inner drum 19 lying on one side of a diameter is open and free to receive garbage or the like, while the other half on the other side of said diameter is covered by the cover plate 24 so that neither garbage, material, nor an operator's hands, may be extended into this portion of the hopper 11.

It is to be particularly noted that the cover plate 24 is directly above the feed chute 16 and consequently it is impossible for an operator to extend his hand into the grinder 10.

The feed hopper 11 may be fed material by being directly exposed or it may be positioned under a work table or sink-board, such as illustrated at 25, which is provided with a feed opening 26 located directly above the open top portion of the upper cylinder or drum 13.

In the operation of the device, garbage or other material to be ground or reduced will be fed through the open top of the hopper 11 into the inner hopper or drum 19, with said inner hopper or drum 19 adjusted so that the upright partition 20 is preferably in substantial alignment with the partition 17. This feeding action may be through the feed opening 26 or may be directly into the mentioned compartment of drum 19 in case the table or sink-board 25 is eliminated.

This garbage would then be held in the one cell or compartment of the hopper 11 and should valuables, such as silverware or the like, inadvertently be delivered thereinto with the garbage it may readily be retrieved. This retrieving can, of course, be effected without the operator in any way endangering himself, since it is impossible for him to stick his hand down through the grinder 10.

The operator may then grasp the wheel or ring 23 and rotate the inner hopper 19 in either direction, under which conditions the partition 20 will act as a scraper conveyor or the equivalent and push or scrape material over the bottom 15 and into the open top of the feed chute 16 which, of course, is in the nature of an opening or hole in the bottom plate 15. The garbage will then be directed by the feed chute 16 aided, if desired, by the spray 18 and delivered to the grinder 10. In some installations the spray 18 may not be considered necessary and may be eliminated.

As previously mentioned, the cover plate 24 which is directly over the open top of feed chute 16, particularly in co-operation with the partition 20, prevents an operator extending his hand through the feed chute 16 into the grinder 10, thus constituting an important safety feature.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

In combination, a garbage grinder, a feed hopper therefor comprising a main hopper having an upwardly extending cylindrical upper portion having an open top, a bottom in said upper portion having an opening on one side of a diameter thereof, a grinder chute below said opening adapted to receive garbage passing through said opening and direct it to said grinder, a cylindrical wall drum mounted for rotation on an upright axis and within the cylindrical portion of said main hopper and having both its top and bottom completely open, an upright diametrical partition in said drum extending between opposite positions of said cylindrical drum and connected thereto, top cover means for the portion of both the main hopper and said drum directly above said grinder chute and said opening therefor extending over half of the open tops of said main hopper and drum thereby covering said half and leaving the other half of each open to receive garbage which is there supported on the above described main hopper bottom for inspection and removal of silverware or the like, and means comprising a hand operable exposed ring carried by said drum for rotating said drum on its axis and thereby delivering the garbage to said grinder chute, the construction acting to prevent a person extending his hand into said grinder chute or into said grinder while providing for inspection of garbage and removal of sliverware or the like as aforesaid.

OSCAR J. FEIGHT.

REFERENCES CITED

The following references are of record in the file of this patent:

UNITED STATES PATENTS

| Number | Name | Date |
|---|---|---|
| 321,573 | Boschke | July 7, 1885 |
| 479,982 | Heath | Aug. 2, 1892 |
| 819,899 | Mann | May 8, 1906 |
| 2,044,489 | Karlsson-Ygger | June 16, 1936 |
| 2,156,075 | Alexay | Apr. 25, 1939 |